(12) United States Patent
Choi

(10) Patent No.: US 6,381,226 B1
(45) Date of Patent: Apr. 30, 2002

(54) GUARD TIME REDUCING SYSTEM IN DATA COMMUNICATION FROM EARTH STATION TO STATIC ORBIT COMMUNICATION SATELLITE AND METHOD THEREOF

(75) Inventor: Seong Il Choi, Seoul (KR)

(73) Assignee: Hyundai Electronics Inds. Co. Ltd, Kyoungki-do (KR)

( * ) Notice: Subject to any disclaimer, the term of this patent is extended or adjusted under 35 U.S.C. 154(b) by 0 days.

(21) Appl. No.: 09/188,800

(22) Filed: Nov. 9, 1998

(30) Foreign Application Priority Data

Nov. 20, 1997 (KR) .......................................... 1997-61561

(51) Int. Cl.[7] .............................................. H04B 7/185
(52) U.S. Cl. ........................ 370/316; 370/508; 455/427
(58) Field of Search ................................. 370/321, 324, 370/345, 347, 350, 328, 337, 508, 316; 455/427, 12.1, 265, 259

(56) References Cited

U.S. PATENT DOCUMENTS

| 4,937,819 | A | * | 6/1990 | King ........................... 370/442 |
|---|---|---|---|---|
| 5,398,263 | A | * | 3/1995 | Vanderspool, II ............ 375/376 |
| 5,416,797 | A | * | 5/1995 | Gilhousen et al. ........... 375/705 |
| 5,719,858 | A | | 2/1998 | Moore ......................... 370/347 |
| 5,732,076 | A | * | 3/1998 | Ketseoglou et al. ......... 370/347 |
| 5,736,959 | A | * | 4/1998 | Patterson et al. ............ 342/354 |
| 5,867,489 | A | * | 2/1999 | Hershey et al. .............. 370/324 |
| 5,875,182 | A | * | 2/1999 | Hatzipapafotiou ........... 370/321 |
| 6,016,322 | A | * | 1/2000 | Goldman ..................... 370/508 |

* cited by examiner

*Primary Examiner*—Ajit Patel
*Assistant Examiner*—Saba Tsegaye
(74) *Attorney, Agent, or Firm*—Lackenbach Siegel

(57) ABSTRACT

A guard time reducing system and a method thereof for realizing a guard time that each packet is near each other in time without overlapping each other. A GPS timing unit finds the propagation passed time from a static orbit communication satellite to an earth station and a packetizing unit transmits a packet as fast as the propagation passed time than the UTC time when the packetizing unit transmits the packet to the static orbit communication satellite. According to the method, it is possible to maximize the use efficiency of the communication channel from the earth station to the static orbit communication satellite because respective earth station transmits data in each time period allocated thereto without overlapping each time period.

8 Claims, 4 Drawing Sheets

GUARD TIME REDUCING SYSTEM IN DATA COMMUNICATION FROM EARTH STATION TO STATIC ORBIT COMMUNICATION SATELLITE AND METHOD THEREOF

FIELD OF THE INVENTION

This invention relates to a satellite communication system which adapts a Time Division Multiplexing(TDM) system using a static orbit communication satellite, and more particularly, to a guard time reducing system in data communication from an earth station to the static orbit communication satellite and a method thereof for realizing a guard time that each packet is near each other in time without overlapping each other, when each of a multiple of earth stations respectively transmits a packet data to the static orbit communication satellite then each packet lands on the satellite.

BACKGROUND OF THE INVENTION

In general, in the satellite communication system using the TDM system, it is used to divide a time into small units and to transmit a part of data by using the divided small times at predetermined intervals for data communicating between the earth stations and the satellite. This method enables to alternatively arrange data transmission operation at time axis in a physical channel, thereby to set a multiple of individual channel.

In the general satellite communication system, respective earth station cannot exactly determine transmission time of packet data. This results in interference between the packet data because respective earth station does not serially transmit the packet data in time without overlapping. For the purpose of preventing the interference between the packet data, it is proposed to have sufficient idle time removing data collision between the packet data, to permit some collision despite of quality degradation of the packet data or to prevent the interference under control of a center station. These methods however, degrade the use efficiency of the channel.

A Network Access Unit(NAU) to transmit synchronous data and packet data with regard to the satellite communication system using the TDM system is disclosed in U.S. Pat. No. 5,719,858. The NAU includes a network access module, synchronous application modules, packet application modules, and a packet manager. The network access module provides the interface between a TDM bus and a network facility. The synchronous application modules couple synchronous data equipment, e.g., telephone equipment, to the network access module via the TDM bus. The packet application modules couple packet data equipment, e.g. a data terminal to the packet manager. The later is a common resource module that performs integral aggregation in one direction, and distribution in the other direction, of packet stream between network access module and each packet application module, via the TDM bus and wideband packet buses, respectively.

As a reset of coupling the packet data to the TDM bus, packet manager provides a single multiplexed packet stream to the network access module for transmission across the network interface. Also, the NAU provides a TDM bus in conjunction with one or more packet buses which taken together provide more bandwidth than is required to support the network interface. This additional bandwidth is used to support multiple point-to-point packet connections. Packet manager not only aggregates the packet data, as mentioned above, but also allocates a fixed amount of the TDM bandwidth to the packet application modules.

Also, the instantaneous, or peak, data rate of all outbound packet streams taken together may be grater than the "fixed amount of TDM bandwidth" allocated for packet data on the network interface. These peak data rates create a large demand on both the overall packet bus capacity and on the packet handling requirements of packet manager. For example, once the packet application modules exceed their allocated network interface bandwidth, the packet manager must take steps to prevent the loss of any packet data. These steps include buffering the packet data, which may require a buffer of considerable size to support all of the packet application modules, and, perhaps, flow control to throttle the packet traffic.

The prior art, however, the complexity of the packet manager increases not only with the number of the packet application modules that the packet manager must support but also with the respective data rate requirements of these packet application modules.

SUMMARY OF THE INVENTION

Therefore, the present invention has been made in view of the problems, and it is an object of this invention to provide a guard time reducing system in data communication from the earth station to the static orbit communication satellite and a method thereof to maximize the use efficiency of the communication line.

In accordance with one aspect of the invention, there is provided a guard time reducing system in data communication from a earth station to a static orbit communication satellite characterized by: a communication unit for generating, storing, transmitting/receiving, and operating of data; a Global Positioning System(GPS) timing unit for receiving position information of the static orbit communication satellite from the communication unit, computing the position of the earth station, finding propagation passed time from the earth station to the static orbit communication satellite and then outputting a time clock and a frequency as fast as the propagation passed time than Universal Coordinated Time(UTC); a packetizing unit for receiving data through the communication unit and diving the data to match a time frame, receiving the time clock and the frequency from the GPS timing unit and transmitting a packet synchronized with the time clock and the frequency to the static orbit communication satellite.

In accordance with other aspect of the invention, there is provided a guard time reducing method in data communication from a earth station to a static orbit communication satellite characterized by the following steps of: finding , in the GPS timing unit, a propagation passed time from the static orbit communication satellite to the earth station; and transmitting a packet as fast as the propagation passed time than the UTC when a packetizing unit transmits the packet to the static orbit communication satellite.

BRIEF DESCRIPTION OF THE DRAWINGS

The above and other objects, feature and advantages of the present invention will be more clearly understood from the following detailed description taken in conjugation with the accompanying drawings, in which.

DETAILED DESCRIPTION OF THE PREFERRED EMBODIMENTS

Hereinbelow, detailed embodiments of the present invention will be described in detail with reference to accompanying drawings.

Figure 1:
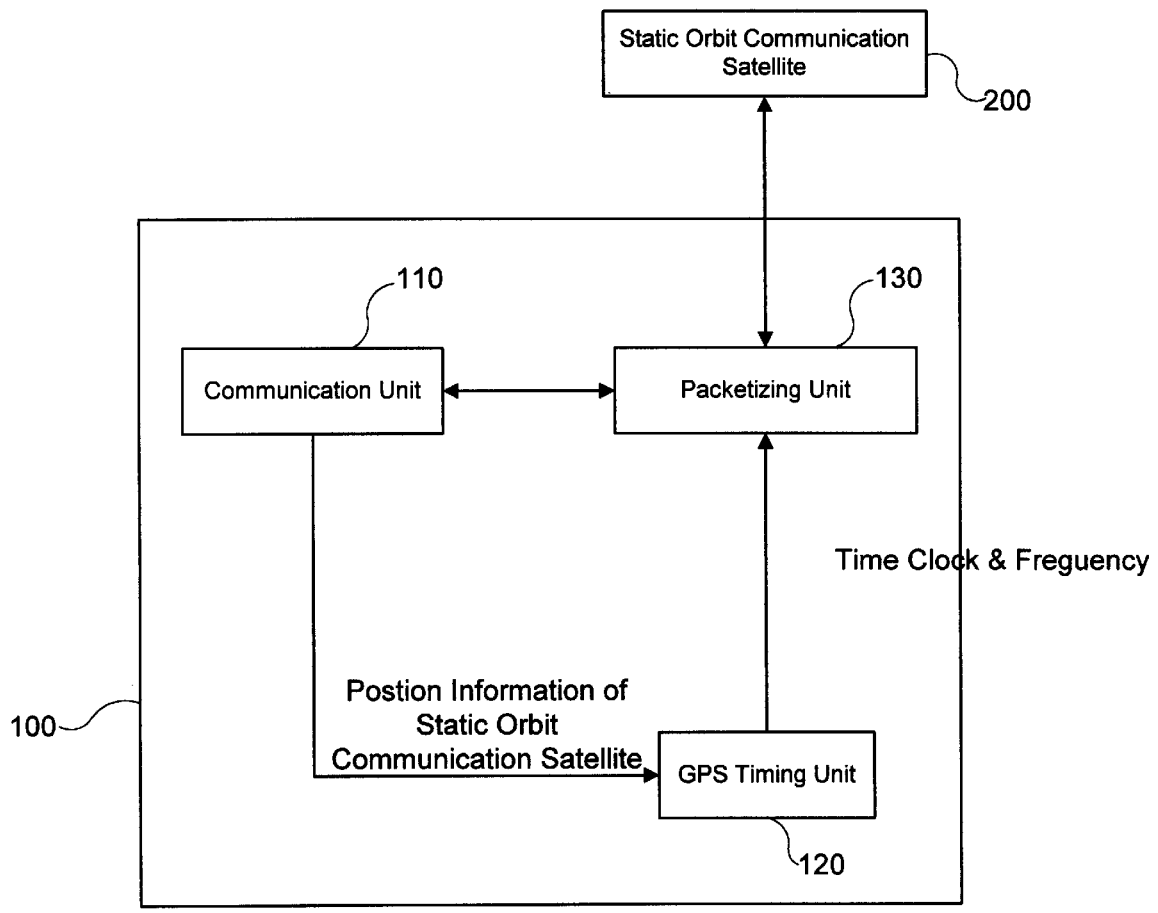
FIG. 1 is a control block structure for a guard time reducing system in data communication from an earth station to a static orbit communication satellite according to one preferred embodiment of the present invention.
Figure 2:
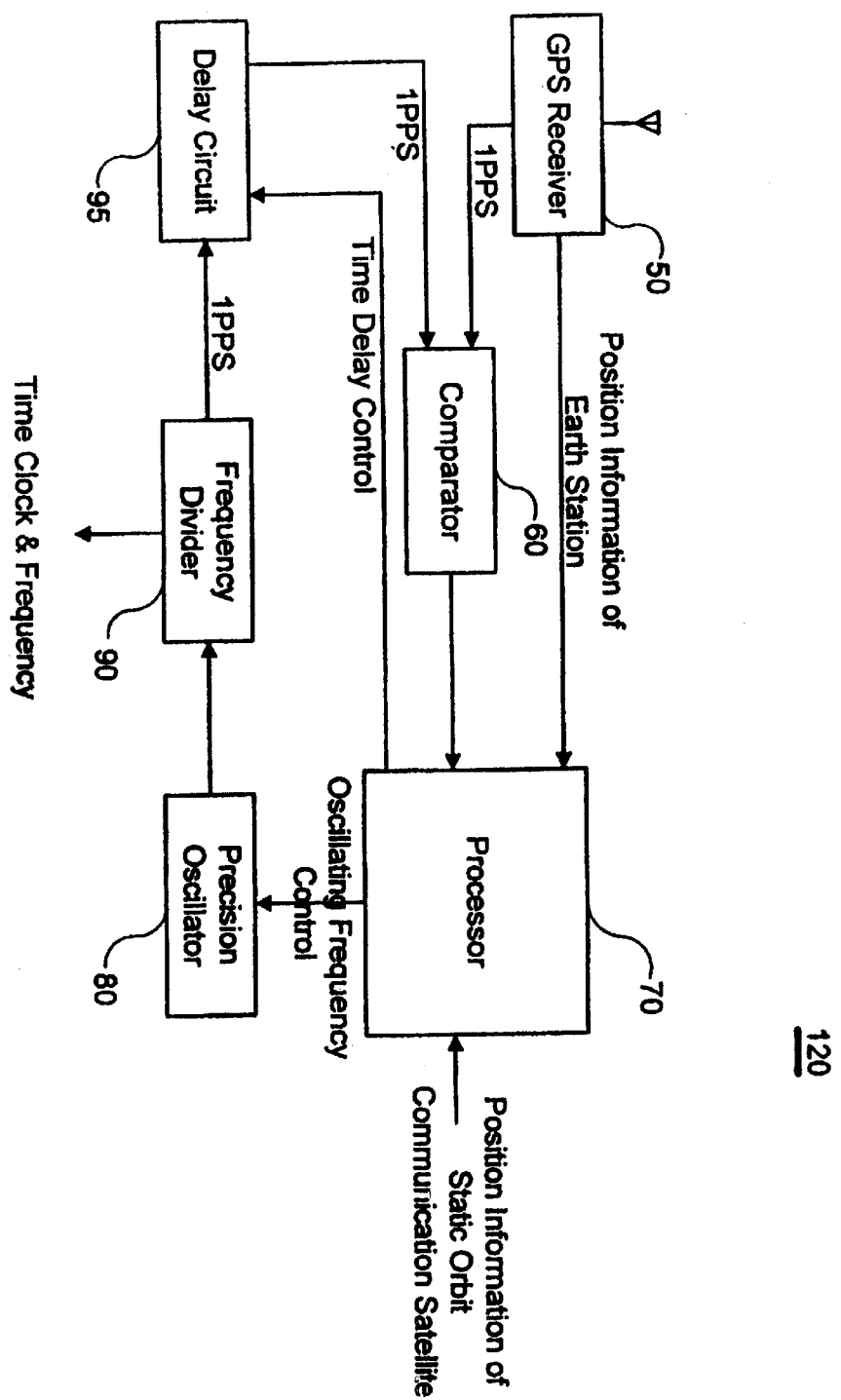
FIG. 2 is a detailed control block structure of a GPS timing unit of FIG. 1.

FIG. 1 is a control block structure for a guard time reducing system in data communication from an earth station (not shown) to a static orbit communication satellite according to one preferred embodiment of the present invention and FIG. 2 is a detailed control block structure of a GPS timing unit of FIG. 1. As illustrated in FIG. 1, a guard time reducing system 100 is consisted of a communication unit 110, a GPS timing unit 120 and a packetizing unit 130.

The communication unit 110 is for generating, storing, transmitting/receiving, and operating of data, the GPS timing unit 120 is for receiving position information of the static orbit communication satellite 200 through the communication unit 110, computing the position of the earth station, finding propagation passed time from the earth station to the static orbit communication satellite 200 and then outputting a time clock and a frequency as fast as the propagation passed time than UTC , and the packetizing unit 130 is for receiving data from the communication unit 130 and dividing the data to match a time frame, receiving the time clock and the frequency from the GPS timing unit 120 and transmitting packet synchronized with the time clock and the frequency to the static orbit communication satellite 200.

As illustrated in FIG. 2, the GPS timing unit 120 is consisted of a GPS receiver 50, a comparator 60, a processor 70, a precision oscillator 80, a frequency divider 90 and a delay circuit 95 The GPS receiver 50 calculates reference time information and position information of the earth station by means of a GPS satellite (not shown). A comparator 60 receives UTC clock of 1 Pusle Per Second (PPS) from the GPS receiver 50, compares the UTC clock with a time clock of 1 PPS inputted from a delay circuit 95 described later on and counts the difference between them. The processor 70 receives the compared results from the comparator 60 and recognizes the time gap . Also, the processor 70 calculates the propagation passed time based on the position information of the earth station received from the GPS receiver 50 and the position information of the static orbit communication satellite 200 received from the communication unit 110. The processor 70 then controls the delay circuit 95 through outputting a control signal for delayed time corresponding to the propagation passed time to the delay circuit 95 and outputs an oscillating frequency control signal to the precision oscillator 80 described later on.

The precision oscillator 80 receives the oscillating frequency control signal from the processor 70 and outputs an oscillating frequency corresponding to the control signal. The frequency divider 90 receives output from the precision oscillator 80, divides the output into 1 PPS and a time clock/frequency and outputs 1 PPS to the delay circuit 95 and the time clock/frequency to the packetizing unit 130. The delay circuit 95 controls the time delay of 1 PPS which is controlled in delay quantity by the processor 70 and outputs the time delay to the comparator 60.

The time clock outputted from the frequency divider 90 makes the packet data from the packetizing unit 130 faster as the propagation passed time from the earth station to the static orbit communication satellite than the UTC . The frequency from the frequency divider 90 determines a transmission frequency of the packet data.

Hereinbelow, description will be started for the guard time reducing method in data communication from the earth station to the static orbit communication satellite.

The guard time reducing method includes the steps of finding, in the GPS timing unit 120 , the propagation passed time from the static orbit communication satellite 200 to the earth station, and transmitting a packet as fast as the propagation passed time than the UTC time when the packetizing unit 130 transmits the packet to the static orbit communication satellite 200.

In the step of finding the propagation passed time, the processor 70 finds the position of the static orbit communication satellite 200 based on the position information of the static orbit communication satellite 200 from the communication unit 110. Also, the processor 70 finds the position of the earth station based on the position information of the earth station from the GPS receiver 50.

Assuming that the position of the earth station and the position of the static orbit communication satellite are (Xm, Ym, Zm) and (Xs, Ys, Zs), respectively, the distance A between the earth station position and the static orbit communication satellite position is calculated according to the Pythagoras theorem by the following equation 1;

$$A = \sqrt{(Xs - Xm)^2 + (Ys - Ym)^2 + (Zs - Zm)^2}$$

Then taking into consideration channel expansion due to diffraction phenomenon by the distance, A between the two positions and propagation reducing phenomenon due to increase of air density, the propagation effect distance B between the earth station and the static orbit communication satellite 200 is calculated by the following equation 2;

$$B = \sqrt{(Xs - Xm)^2 + (Ys - Ym)^2 + (Zs - Zm)^2} + D_{diffraction}(\theta xyz) + D_{propagation}(\theta xyz)$$

In the equation 2, $D_{Diffraction}(\theta \ xyz)$ is a variable according to the diffraction phenomenon by variation of air density and $D_{Propogation}(\theta \ xyz)$ is a variable according to required time to pass same distance in the air than in vaccum.

The propagation passed time from the earth station to the static orbit communication satellite is the propagation effect distance divided by the velocity of light.

Figure 3:
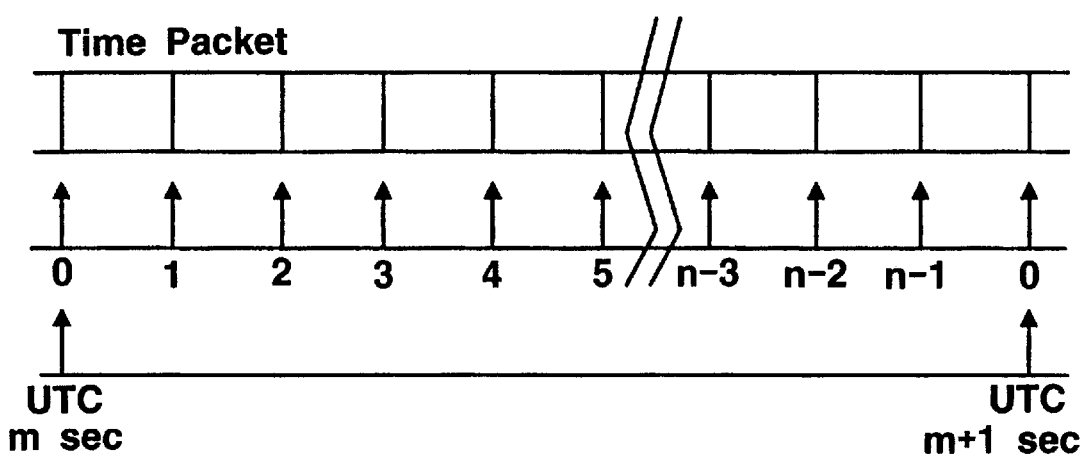
FIG. 3 is a timing chart of a predetermined length packet adapted to the present invention transmitted from the earth station.

FIG. 3 is a timing chart of a predetermined length packet adapted to the present invention transmitted from the earth station, in which, in the construction of the packet to be transmitted from the earth station, the 1th bit should be synchronized with the time clock from the GPS timing unit 120 for stable operating, and the GPS timing unit 120 should provide the frequency synchronized with the time clock to the packetizing unit 130 to synchronize transmitting data with the time clock. Also, the earth station have to use the frequency outputted from the GPS timing unit 120.

It should be noted that when the sum of the data packetized in the packetizing unit 130 and the guard time exceeds one packet preriod, because the data collision possibility is grater 0% due to lack of the guard time, which cannot insure data reliability, the length of packet must have the value that subtracted the guard time from the one packet period.

Also, a clock of 1 second unit is suitable for the reference time of the earth station with reference to the UTC clock, and the period of pulse synchronized with the UTC may be defined according to the demand of the present system. For example, if we want to retrain the length of the packet to 100 μsec, 1 second period admits 10,000 packets. In case of numbering respective packet, an earth station occupies one packet at associated optional time. Therefore, other earth station transmits data to the static orbit communication satellite on different packet from the earth station. According to this, the packet already occupied can successfly end communication. Although the packet have destroyed by means of collision with next packet, there is no problem as it is possible to re-transmit only the content of the packet. That is, although multiple earth stations randomly transmit packets to the static orbit communication satellite, because the length of packet being destroyed was refined, it becomes possible to use efficiently communication channel in data communication.

Figure 4:
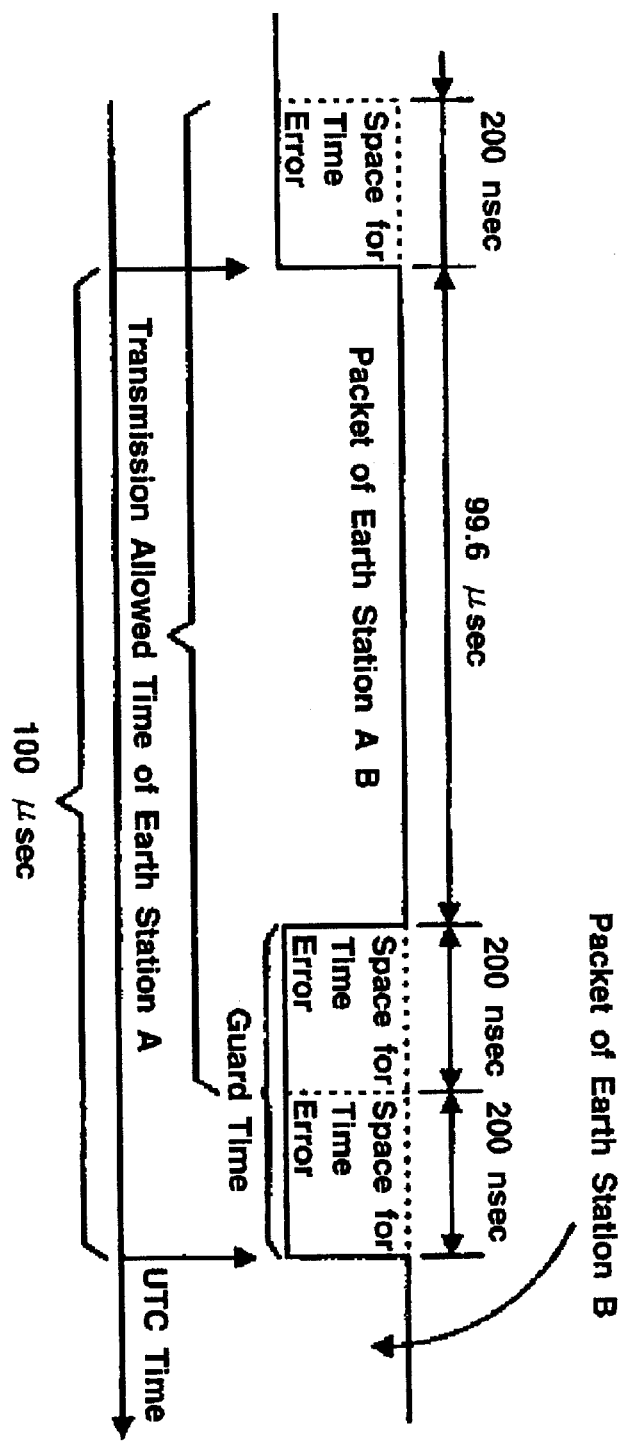
FIG. 4 is a timing chart for illustratively showing computation for a guard time between each earth station.

FIG. 4 is a timing chart for illustratively showing computation for the guard time between each earth station. If one earth station A transmits one packet and then other earth station transmits other packet, for example, assuming that an accumulated error may be admitted by 200 nsec for the UTC, the guard time between the earth stations becomes 400 nsec of two times the accumulated. The guard time must be determined to 400 nesc to prevent overlap of the packets between the earth station A and the earth station B, in consideration of direction of error therebetween.

As described on the above, according to the present invention, the GPS timing unit finds the propogation passed time from the static orbit communication satellite to the earth station, and the packetizng unit transmits a packet as fast as the propagation passed time than the UTC time when the packetizing unit transmits the packet to the static orbit communication satellite, therefore it is possible to maximize the use efficiency of the communication channel from the earth station to the static orbit communication satellite because each earth station transmits data in each time period allocated thereto without overlapping each time period.

It is further understood by those skilled in the art that the foregoing description is a preferred embodiment of the disclosed system and method and that various changes and modifications may be made in the invention without departing from the spirit and scope thereof.

What is claimed is:

1. A guard time reducing system in data communication from an earth station to a static orbit communication satellite comprising:
    a communication unit for generating, storing, transmitting/receiving, and operating of data:
    a Global Positioning System (GPS) timing unit for receiving position information of the static orbit communication satellite through the communication unit, computing the position of the earth station, deriving a propagation passed time from the earth station to the static orbit communication satellite and then outputting a time clock and a frequency advancing Universal Coordinated Time (UTC) by the propagation passed time;
    a packetizing unit for receiving data from the communication unit and dividing the data to match a time frame, receiving the time clock and the frequency from the GPS timing unit and transmitting a packet synchronized with the time clock and the frequency to the static orbit communication satellite; wherein the GPS timing unit comprises:
        a GPS receiver for receiving reference time information and position information of the earth station from a GPS satellite;
        a delay circuit for applying a delay amount to the time clock of 1 PPS;
        a comparator for receiving UTC clock of 1 PPS from the GPS receiver and the time clock of 1 PPS from the delay circuit and comparing them to calculate the difference between them;
        a processor for receiving the compared results from the comparator, calculating the propagation passed time based on the position information of the earth station received from the GPS receiver and the position information of the static orbit communication satellite from the communication unit, outputting to the delay circuit a control signal to control the delay amount in accordance with the propagation passed time and outputting an oscillating frequency control signal;
        a precision oscillator for receiving the oscillating frequency control signal from the processor and generating an oscillating frequency responsive to the control signal; and
        a frequency divider for receiving an output oscillator signal from the precision oscillator and dividing the output into 1 PPS oscillator signal which is supplied to the packetizing unit.

2. A guard time reducing method in data communication from an earth station to a static orbit communication satellite comprising the steps of:
    deriving, in a GPS time unit, a propagation passed time from the static orbit communication satellite to the earth station and ascertaining a frequency as fast as the propagation passed time than Universal Coordinated Time (UTC), the step of deriving comprises the steps of:
    receiving, in the GPS timing unit, the position information of the static orbit communication satellite from a communication unit; receiving, in the GPS timing unit, the position information of the earth station from a GPS satellite;
    deriving, in the GPS timing unit, a propagation effect distance between the earth station and the static orbit communication satellite, taking into consideration channel expansion due to diffraction phenomenon by the distance between the static orbit communication satellite and the earth station, and propagation reducing phenomenon due to increase of air density; and
    calculating in the GPS timing unit, the propagation passed time from the earth station to the static orbit communication satellite by dividing the propagation effect distance by the velocity of light; and
    advancing a transmission of packets by the propagation passed time than the UTC when a packetizing unit transmits packets to the static orbit communication satellite.

3. The guard time reducing system as claimed in claim 1 wherein the comparator counts the difference between the UTC clock and the time clock of 1 PPS from the delay circuit.

4. The guard time reducing system, as claimed in claim 1, wherein the delay circuit controls the time delay of 1 PPS and the processor controls delay quantity, and the time delay is supplied to the comparator.

5. The guard time reducing system, as claimed in claim 3, wherein the delay circuit controls the time delay of 1 PPS and the processor controls delay quantity, and the time delay is supplied to the comparator.

6. The guard time reducing method as claimed in claim 2, wherein the packet is transmitted as fast as the propagation passed time than the UTC when the packetizing unit transmits the packet to the static orbit communication satellite, thereby maximizing use efficiency of communication channel from the earth station to the static orbit communication satellite thereby enabling each earth station to transmit data in each time period allocated thereto without overlapping each time period.

7. The guard time reducing method as claimed in claim 2, wherein the step of deriving a propagation effect distance includes the step of ascertaining from the GPS timing unit the propagation passed time from the static orbit communications satellite to the earth station.

8. The guard time reducing method as claimed in claim 6, wherein the step of deriving a propagation effect distance includes the step of ascertaining from the GPS timing unit the propagation passed time from the static orbit communications satellite to the earth station.

* * * * *